United States Patent
Jamadagni et al.

(10) Patent No.: US 10,083,021 B2
(45) Date of Patent: Sep. 25, 2018

(54) METHOD AND APPARATUS FOR PROVIDING FIRMWARE OVER THE AIR SERVICE TO USER EQUIPMENTS

(71) Applicant: Samsung Electronics Co., Ltd., Suwon-si, Gyeonggi-do (KR)

(72) Inventors: Satish Nanjunda Swamy Jamadagni, Bangalore (IN); Mallikarjuna Hampali, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 14/363,121

(22) PCT Filed: Dec. 6, 2012

(86) PCT No.: PCT/KR2012/010574
§ 371 (c)(1),
(2) Date: Jun. 5, 2014

(87) PCT Pub. No.: WO2013/085316
PCT Pub. Date: Jun. 13, 2013

(65) Prior Publication Data
US 2014/0366012 A1    Dec. 11, 2014

(30) Foreign Application Priority Data
Dec. 6, 2011  (IN) ............................ 4242/CHE/2011

(51) Int. Cl.
*G06F 9/44* (2018.01)
*G06F 9/445* (2018.01)
(Continued)

(52) U.S. Cl.
CPC .............. *G06F 8/65* (2013.01); *G06F 8/654* (2018.02); *H04W 4/50* (2018.02); *H04W 8/245* (2013.01)

(58) Field of Classification Search
CPC ..... G06F 8/65; G06F 8/60; G06F 8/61; G06F 9/44505; H04W 36/04; H04W 4/00
See application file for complete search history.

(56) References Cited

U.S. PATENT DOCUMENTS

| | | | | |
|---|---|---|---|---|
| 7,840,683 B2 * | 11/2010 | Zhang | ................... | G06F 9/5083 709/227 |
| 7,881,745 B1 * | 2/2011 | Rao | ........................... | G06F 8/65 455/414.1 |

(Continued)

OTHER PUBLICATIONS

Michael Becher et al.; Mobile Security Catching Up Revealing the Nuts and Bolts of the Security of Mobile Devices; 2011 IEEE; pp. 96-111; <https://ieeexplore.ieee.org/stamp/stamp.jsp?tp=&arnumber=5958024> (Year: 2011).*

(Continued)

*Primary Examiner* — Thuy Dao
*Assistant Examiner* — Cuong V Luu
(74) *Attorney, Agent, or Firm* — Jefferson IP Law, LLP

(57) ABSTRACT

A method and an apparatus for providing a firmware over the air service to user equipments in a wireless network environment are provided. In one embodiment, a device management server sends a notification to a base station indicating availability of a new firmware version for associated user equipments. The base station obtains a firmware update resource identifier from the device management server upon receiving the notification. Further, the base station fetches a firmware update associated with the new firmware version from a Firmware Over-The-Air (FOTA) server and caches the firmware update in a cache memory. Thereafter, the base station sends a paging message indicating availability of the cached firmware update to the user equipments currently attached to the base station. Upon receiving a paging response from the respective user equipments, the base (Continued)

station transmits the cached firmware update to the respective user equipments over a wireless air interface.

12 Claims, 8 Drawing Sheets

(51) Int. Cl.
  *G06F 8/65* (2018.01)
  *H04W 8/24* (2009.01)
  *H04W 4/50* (2018.01)
  *G06F 8/654* (2018.01)

(56) References Cited

U.S. PATENT DOCUMENTS

| | | | | |
|---|---|---|---|---|
| 8,555,273 B1* | 10/2013 | Chia | | G06F 8/654 717/173 |
| 8,724,509 B2* | 5/2014 | Cheng | | H04W 76/022 370/254 |
| 8,792,851 B2* | 7/2014 | Matsumura | | H04W 52/0206 455/403 |
| 8,862,160 B2* | 10/2014 | Laroia | | H04W 68/00 370/252 |
| 9,402,147 B2* | 7/2016 | Hsu | | H04W 4/005 |
| 2003/0135613 A1* | 7/2003 | Yoshida | | H04L 12/2602 709/224 |
| 2003/0182414 A1* | 9/2003 | O'Neill | | G06F 8/65 709/223 |
| 2004/0031029 A1* | 2/2004 | Lee | | G06F 8/65 717/171 |
| 2004/0083472 A1* | 4/2004 | Rao | | G06F 8/65 717/171 |
| 2004/0230965 A1* | 11/2004 | Okkonen | | G06F 8/71 717/168 |
| 2006/0174242 A1* | 8/2006 | Zhu | | G06F 8/65 717/172 |
| 2007/0169073 A1 | 7/2007 | O'Neill et al. | | |
| 2008/0014969 A1* | 1/2008 | Laroia | | H04W 68/00 455/458 |
| 2008/0059639 A1* | 3/2008 | Zhang | | G06F 9/5083 709/227 |
| 2008/0168435 A1* | 7/2008 | Tupman | | G06F 8/65 717/173 |
| 2010/0175062 A1* | 7/2010 | Kim | | G06F 8/65 717/173 |
| 2010/0313194 A1* | 12/2010 | Juneja | | G06F 8/65 717/171 |
| 2011/0269485 A1* | 11/2011 | Varinot | | H04L 12/5895 455/466 |
| 2012/0039213 A1* | 2/2012 | Cheng | | H04W 76/022 370/254 |
| 2012/0084767 A1* | 4/2012 | Ishimoto | | G06F 8/65 717/173 |
| 2012/0184205 A1* | 7/2012 | Luft | | H04W 52/02 455/9 |
| 2012/0289178 A1* | 11/2012 | Matsumura | | H04W 52/0206 455/403 |
| 2013/0015953 A1* | 1/2013 | Hsu | | H04W 4/005 340/7.46 |

OTHER PUBLICATIONS

C.J. Sreenan et al.; Updating Software in Wireless Sensor Networks A Survey; 2006 Citeseer; 14 pages; <http://citeseerx.ist.psu.edu/viewdoc/download?doi=10.1.1.100.4510&rep=rep1&type=pdf> (Year: 2006).*

Jinsik Kim et al.; Remote Progressive Firmware Update for Flash-Based Networked Embedded Systems; 2009 ACM; pp. 407-412; <https://dl.acm.org/citation.cfm?id=1594337> (Year: 2009).*

Jinsik Kim et al.; Energy-Efficient Progressive Remote Update for Flash-Based Firmware of Networked Embedded Systems; 2010 ACM; 26 pages; <https://dl.acm.org/citation.cfm?id=1870116> (Year: 2010).*

Cherif Diallo et al.; Virtual Base Station Election for Wireless Sensor Networks; 2008 ACM; pp. 19-25; <https://dl.acm.org/citation.cfm?id=1416787> (Year: 2008).*

Hao Li et al.; FEMU A Firmware-Based Emulation Framework for SoC Verification; 2010 ACM; pp. 257-266; <https://dl.acm.org/citation.cfm?id=1879007> (Year: 2010).*

* cited by examiner

METHOD AND APPARATUS FOR PROVIDING FIRMWARE OVER THE AIR SERVICE TO USER EQUIPMENTS

CROSS-REFERENCE TO RELATED APPLICATION(S)

This application is a U.S. National Stage application under 35 U.S.C. § 371 of an International application filed on Dec. 6, 2012 and assigned application number PCT/KR2012/010574, which claimed the benefit of an Indian patent application filed on Dec. 6, 2011 in the Indian Intellectual Property Office and assigned Serial number 4242/CHE/2011, the entire disclosure of which is hereby incorporated by reference.

TECHNICAL FIELD

The present disclosure relates to the field of firmware upgrade for a user equipment. More particularly, the present disclosure relates to a method and an apparatus for providing a firmware over the air service to user equipments in a wireless communication environment.

BACKGROUND

Generally, a user equipment operates through firmware. As is well known, firmware refers to programming instructions used to control the hardware of a mobile device in operation. Such firmware may often improve and evolve into new versions to provide better performance and debugging. When a new version of specific firmware is developed, users can upgrade the firmware in their user equipments by using various wired or wireless techniques. A recent and remarkable upgrade technique is a Firmware Over-The-Air (FOTA) service.

FOTA provides an upgrade of firmware by offering an update package via a wireless network. In a FOTA service, an update package, also referred to as a delta file, is created by the extraction of differences between an old version and a new version of firmware. Typically, a device management server sends a firmware download resource identifier to a user equipment for downloading an update package. For example, the user equipment may obtain the firmware download resource identifier from the device management server using a push initiation or polling technique. Using the firmware download resource identifier, the user equipment fetches the update package from a FOTA server and upgrades the firmware by replacing modified parts of existing firmware with the update package.

Some of the user equipments in the wireless network may be switched off or operating in emergency mode when the device management server has initiated a FOTA service to all the user equipments. Consequently, such user equipments may miss critical FOTA updates. Also, the device management server providing FOTA service to large number of user equipments in the wireless network may lead to overloading of the core network with signaling and data transfers.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for providing firmware over the air service to user equipments in a wireless network environment.

In accordance with an aspect of the present disclosure, a method and system for providing a firmware over the air service to user equipments in a wireless network environment is provided. In one embodiment, a device management server sends a notification to a base station indicating availability of a new firmware version for associated user equipments. The base station obtains a firmware update resource identifier from the device management server upon receiving the notification. Further, the base station fetches a firmware update associated with the new firmware version from a Firmware Over-The-Air (FOTA) server and caches the firmware update in a cache memory. Thereafter, the base station sends a paging message indicating availability of the cached firmware update to the user equipments currently attached to the base station. Upon receiving a paging response from the respective user equipments, the base station transmits the cached firmware update to the respective user equipments.

In accordance with another aspect of the present disclosure, a method of providing a FOTA service to user equipments in a wireless network environment is provided. The method includes obtaining a firmware update intended for a plurality of user equipments in a wireless network environment from a FOTA server by a base station, obtaining the user equipment identities for a plurality of user equipments in a wireless network environment for which the FOTA update should be applied by the base station, caching the firmware data intended for the plurality of user equipments in a cache server of the base station, and providing the cached firmware update to one or more user equipments associated with the base station.

In accordance with another aspect of the present disclosure, a method of providing a FOTA service to user equipments in a wireless network environment is provided. The method includes notifying of the availability of a firmware update for a plurality of user equipments to each of a plurality of base stations in a wireless network environment, and providing a firmware update resource identifier associated with the firmware update to each base station so the base station obtains the firmware update from a FOTA server using the firmware update resource identifier and caches the firmware update for providing to associated one or more of the plurality of user equipments.

In accordance with another aspect of the present disclosure, an apparatus of a base station of providing a FOTA service to user equipments in a wireless network environment is provided. The apparatus includes a processor for obtaining a firmware update intended for a plurality of user equipments in a wireless network environment from a FOTA server, and obtaining the user equipment identities for a plurality of user equipments in a wireless network environment for which the FOTA update should be applied by the base station, and a memory for caching the firmware data intended for the plurality of user equipments. The processor is adapted for providing the cached firmware update to one or more user equipments associated with the base station.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
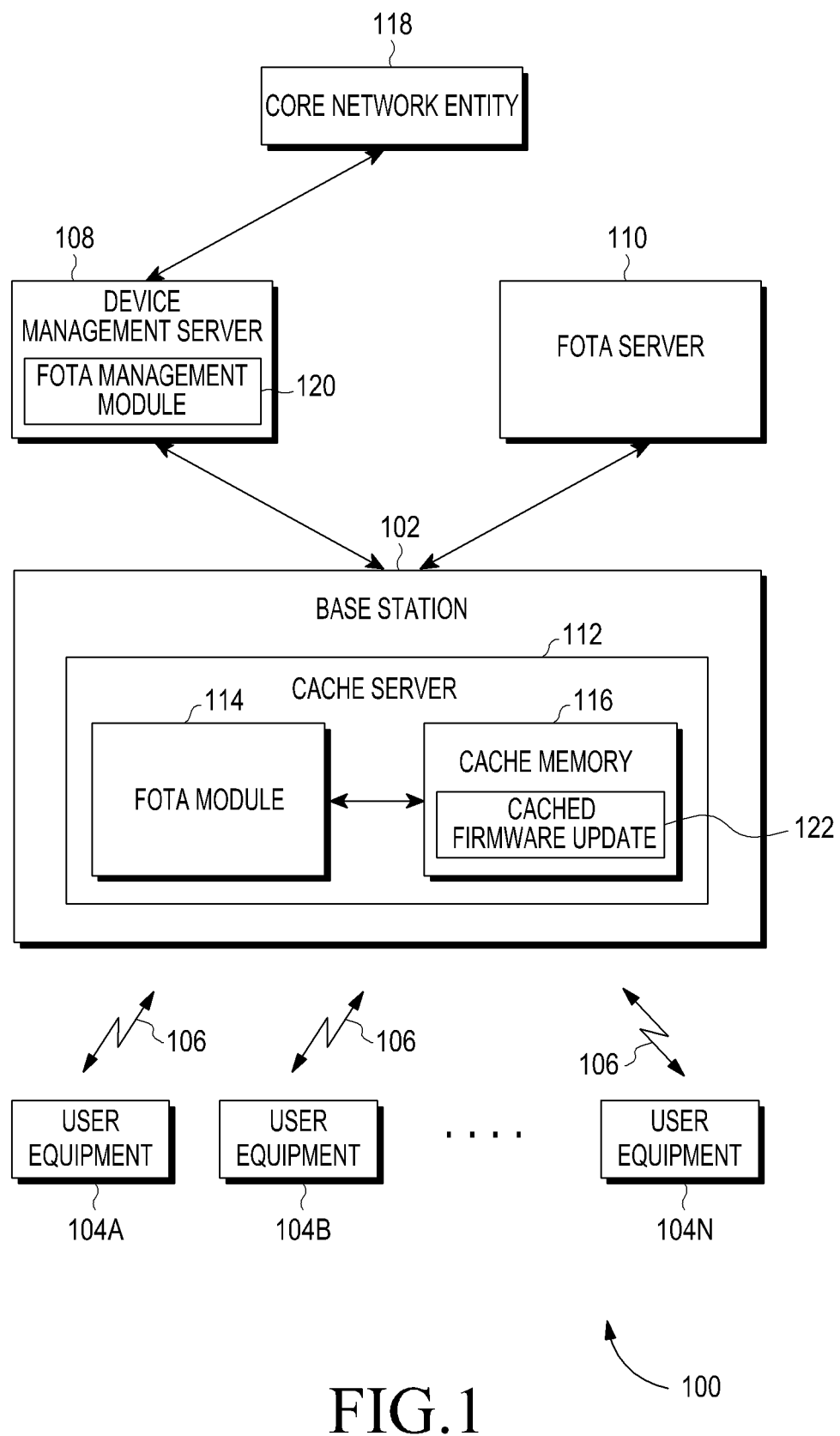
FIG. 1 illustrates a block diagram of a wireless network environment in which a base station is configured for caching a firmware update and providing the cached firmware update to an associated user equipment according to an embodiment of the present disclosure.

FIG. 1 illustrates a block diagram of a wireless network environment in which a base station is configured for caching a firmware update and providing the cached firmware update to an associated user equipment according to an embodiment of the present disclosure.

Referring to FIG. 1, the wireless communication environment 100 includes a base station 102, user equipments 104A-N, a wireless air interface 106, a device management server 108, a Firmware Over-The-Air (FOTA) server 110, and a core network entity 118. The base station 102 may be a Node B, an evolved Node B (eNodeB), a femto cell, a home eNodeB, and the like.

The base station 102 includes a cache server 112 containing a FOTA service module 114, and a cache memory 116. The FOTA service module 114 may be an integrated circuit such as a microprocessor configured for processing executable program instructions stored therein. The device management server 108 may be an open mobile alliance device management server or any other server containing a FOTA management module 120. The FOTA server 110 may be configured for storing firmware updates for the user equipments 104A-N. In one embodiment, the device management server 108 and the FOTA server 110 may be two separate servers remotely connected to the base station 102. In another embodiment, the device management server 108 and the FOTA server 110 may be a part of single remote server connected to the base station 102. Although a single base station is shown as part of the wireless network environment for the purpose of illustration, it is understood that the device management server 108 and the FOTA server 110 can be connected to multiple base stations serving different user equipments in a wireless network.

According to the present disclosure, the FOTA management module 120 sends a notification to the base station 102 indicating the availability of a new firmware version for the associated user equipments 104A-N. The FOTA service module 114 obtains a firmware update resource identifier from the device management server 108 upon receiving the notification. Thereafter, the FOTA service module 114 fetches a firmware update (also commonly known as an update package or a delta file) associated with a new firmware version from the FOTA server 110 and caches the firmware update in the cache memory 116.

In one embodiment, the FOTA service module 114 sends a paging message indicating availability of the cached firmware update 122 to the user equipments 104A-N currently attached to the base station 102. Upon receiving a paging response from the respective user equipments 104A-N, the FOTA service module 114 provides the cached firmware update 122 to the respective user equipments 104A-N over the wireless air interface 106. This and other various embodiments are now described in greater detail in the following description.

Figure 2:
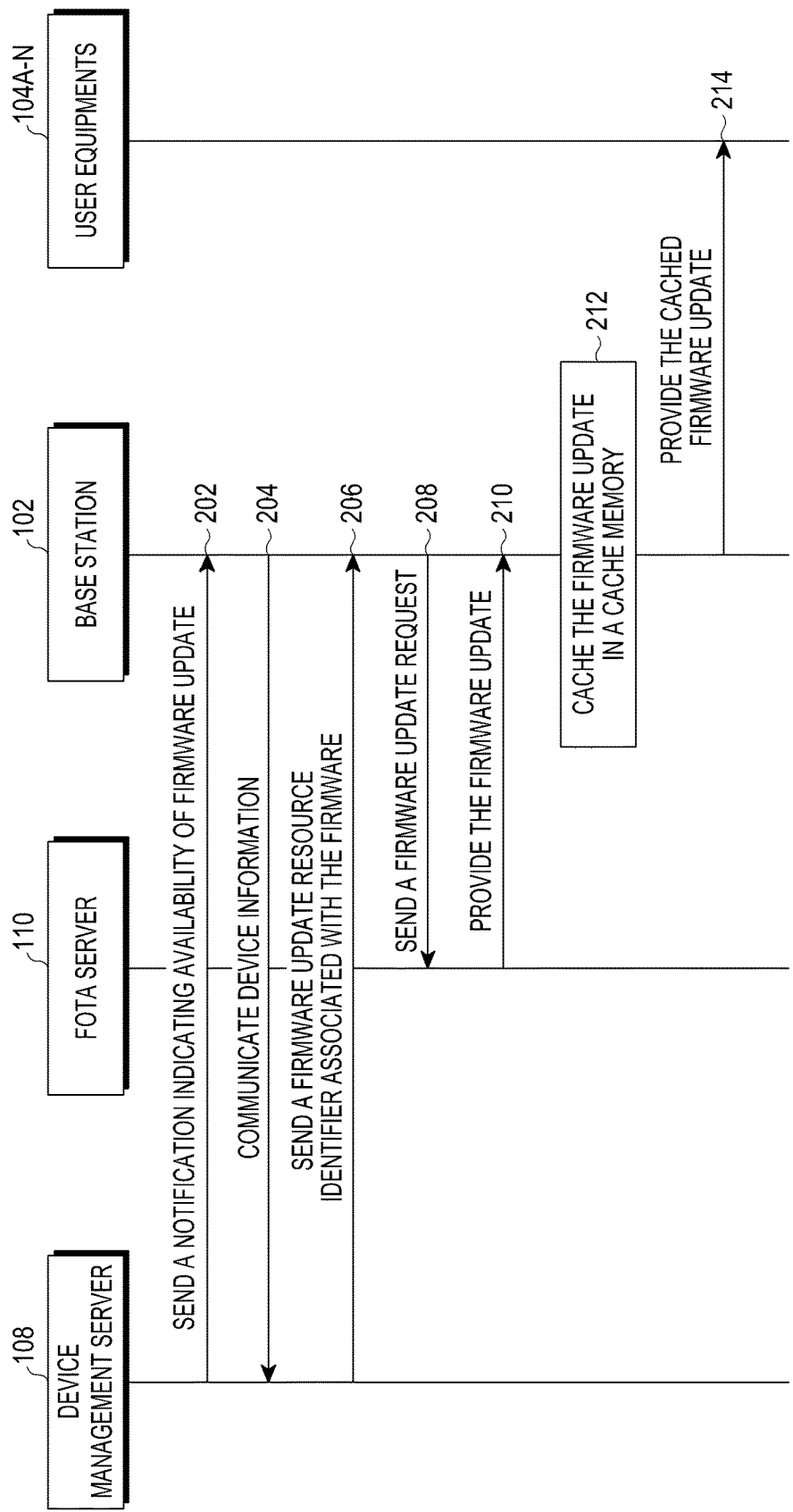
FIG. 2 is a flow diagram illustrating a method of caching and providing a Firmware Over-The-Air (FOTA) service to a user equipment in a wireless network environment according to an embodiment of the present disclosure.

FIG. 2 is a flow diagram illustrating a method of caching and providing a FOTA service to a user equipment in a wireless network environment according to an embodiment of the present disclosure.

Referring to FIG. 2, when a firmware update intended for user equipments is available, at operation 202, the device management server 108 sends a notification to the base station 102 indicating the availability of the firmware update. In various embodiments, the device management server 102 sends a notification indicating availability of the firmware update to one or more base stations when a new firmware update is received from an external system (e.g., third party software vendor). In other various embodiments, the device management server 102 sends the notification indicating availability of the firmware update to a particular base station (e.g., the base station 102) based on the probability of a particular user equipment (e.g., the user equipment 104A) visiting the base station 102 during the course of time.

At operation 204, the base station 102 communicates device information (e.g., device type, device identifier, device capabilities, etc.) with the device management server 108. At operation 206, the device management server 108 sends a firmware update resource identifier associated with the firmware update to the base station 102. In some embodiments, the firmware resource update identifier may be a universal resource locator indicating location of the firmware update intended for the user equipments.

At operation 208, the base station 102 sends a request for the firmware update to the FOTA server 110 using the firmware update resource identifier. In various embodiments, the base station 102 sends a request for download descriptor (i.e., information on a structure for downloading the firmware update) to the FOTA server 110 and the FOTA server 110 sends the download descriptor to the base station 102 in response to the request. In these various embodiments, the base station 102 sends a request for the firmware update to the FOTA server 110 based on the download descriptor.

At operation 210, the FOTA server 110 provides the firmware update associated with the firmware update resource identifier to the base station 102. At operation 212, the base station 102 caches the firmware update intended for the user equipments 104A-N in the cache server 112 of the base station 102 and provides the firmware version associated with the cached firmware update 122 to the device management server 108. At operation 214, the base station 102 provides the firmware update to user equipments associated with the base station 102 over the wireless air interface 106 as will be described in greater detail in FIGS. 3 to 4C.

Figure 3:
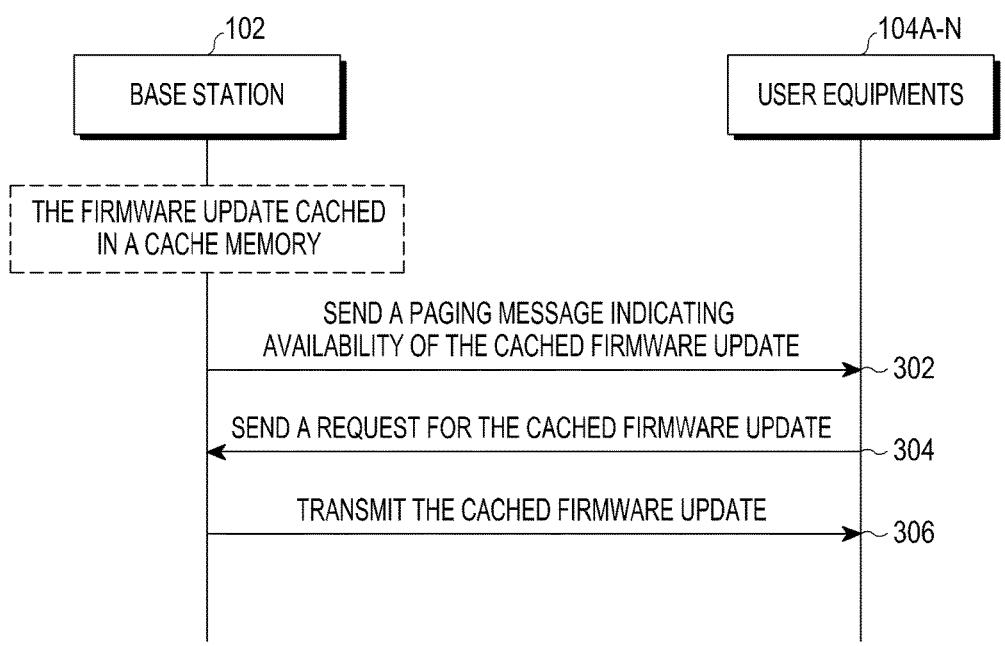
FIG. 3 is a flow diagram illustrating a method of providing a cached firmware update to a user equipment according to an embodiment of the present disclosure.

FIG. 3 is a flow diagram illustrating a method of providing a cached firmware update to a user equipment according to an embodiment of the present disclosure.

Referring to FIG. 3, at operation 302, the base station 102 sends a local paging message indicating availability of the cached firmware update 122 to an associated user equipment (e.g., user equipment 104A) during a paging interval. The local paging message may include a paging clause or paging indication flag set to FOTA update indicator. If no paging response is received from the user equipment 104A, the base station 102 resends a local paging message to the user equipment after a period of time. It is appreciated that the time period for retransmitting the local paging message when no paging response is received is specific to the implementation at the base station 102.

At operation 304, the user equipment 104A sends a request for the cached firmware update 122 to the base station 102 based on the paging message. At operation 306, the base station 102 transmits the cached firmware update 122 to the user equipment 104A over the wireless air interface. In various embodiments, the base station 102 may allocate a dedicated set of resources to the user equipment 104A and transmit the cached firmware update 122 over the allocated resources.

Figure 4A:
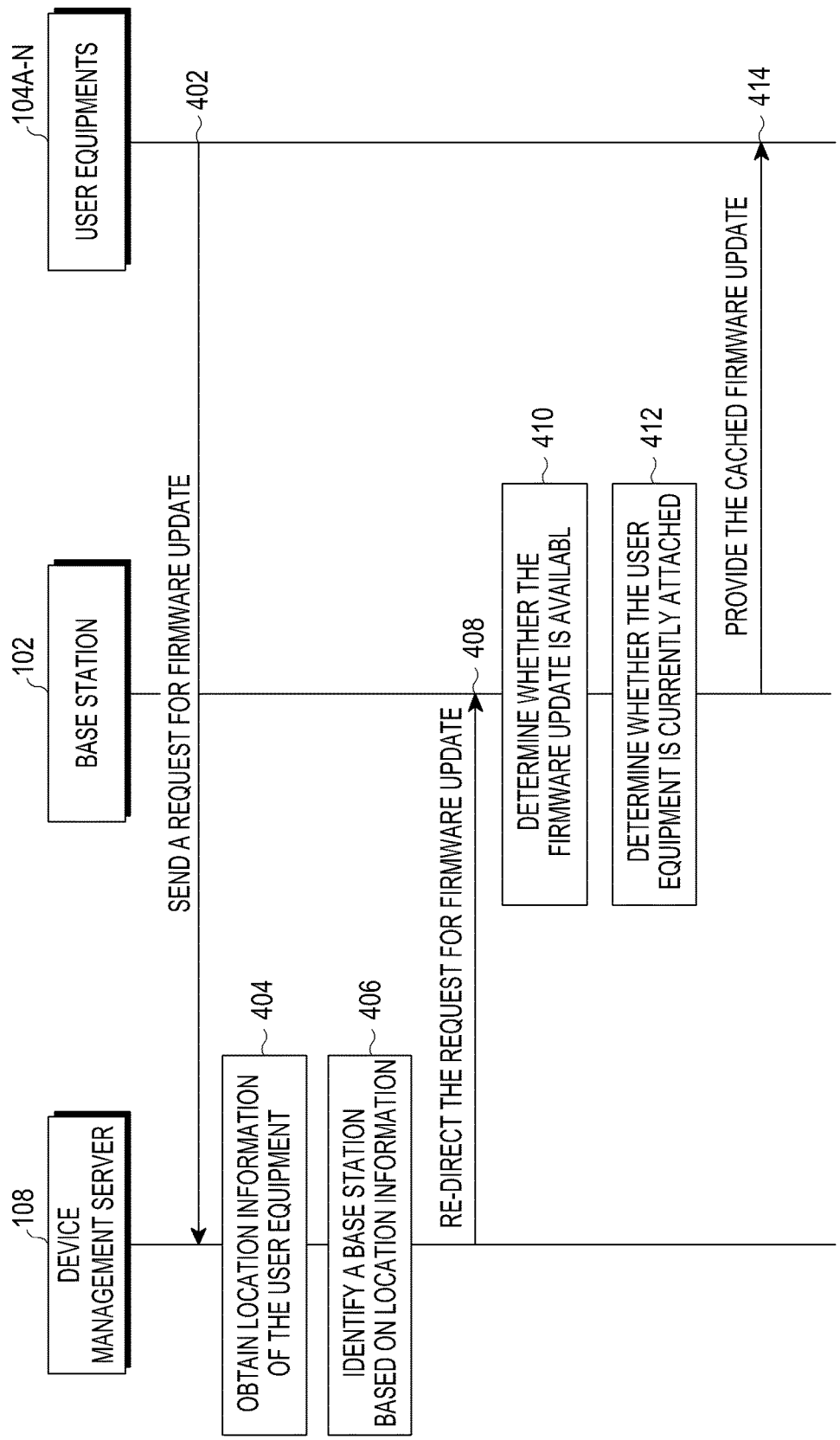
FIG. 4A is a flow diagram illustrating a method of providing a cached firmware update to a user equipment according to an embodiment of the present disclosure.

FIG. 4A is a flow diagram illustrating a method of providing a cached firmware update to a user equipment according to an embodiment of the present disclosure.

Referring to FIG. 4A, a user equipment (e.g., the user equipment 104A) may want to determine whether any new firmware update is available. For example, the user of the user equipment 104A may wish to upgrade the firmware version currently installed on the user equipment 104A. In such case, at operation 402, the user equipment 104A sends a request for new firmware update to the device management server 108. At operation 404, the FOTA management module 120 in the device management server 108 obtains location information associated with the user equipment 104A from a core network entity 118. At operation 406, the FOTA management module 120 identifies a base station (e.g., the base station 102) serving the user equipment 104A based on the location information associated with the user equipment 104A.

At operation 408, the FOTA management module 120 re-directs the request for firmware update to the identified base station 102. At operation 410, the base station 108 determines whether the firmware update requested by the user equipment 104A is present in the cache memory 116. If the desired update is available in the cache memory, then at operation 412, the base station 108 determines whether the user equipment 104A associated with the re-directed request is currently present in a cell associated with the base station. In various embodiments, the base station 102 transmits a local paging message with a paging clause or paging indication flag set to FOTA update indicator to determine whether the intended user equipments 104A-N are in a cell associated with the base station 102. The base station 102 transmits the local paging message to the intended user equipments 104A-N using respective UE identifiers. It can be noted that the base station 102 obtains the UE identifier (e.g., International Mobile Subscription Identity (IMSI), Temporary Mobile Subscription Identity (TMSI), etc.) from the core network entity 118 (e.g., Mobility Management entity (MME)) either before, during or after the reception of the re-directed request for firmware update from the device management server 108. Alternatively, the base station 102 can obtain the UE identifiers for local paging from the MME immediately after caching the firmware update from the FOTA server 110. If any user equipment is present in the cell and is operating in an idle mode, the user equipment sends a paging response to the base station 102 upon receiving the local paging message. In such case, the base station performs operation 414, else performs operations 452 and 454 in FIG. 4B. At operation 414, the base station 102 transmits the cached firmware update to the user equipment 104A over the wireless air interface.

Figure 4B:
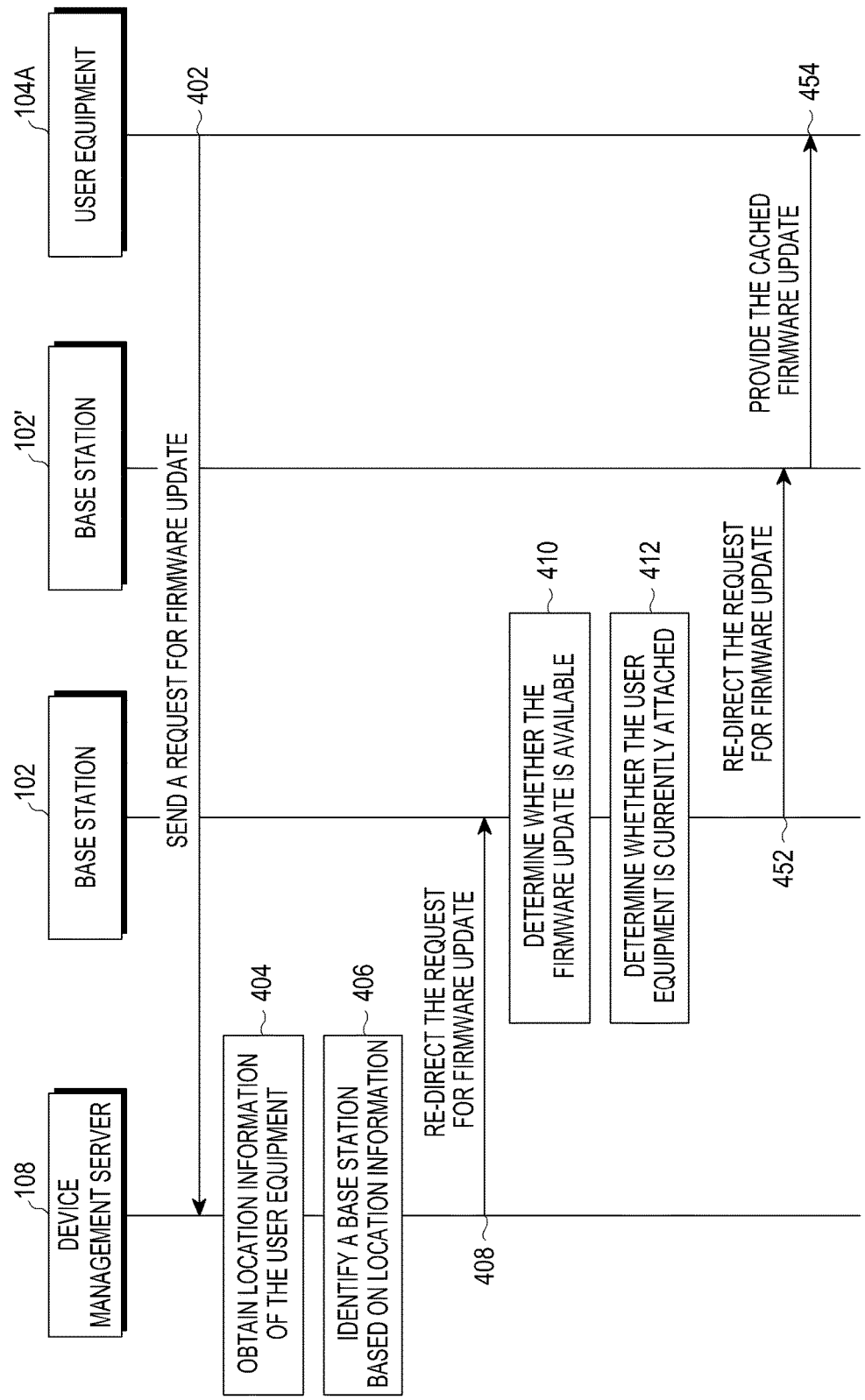
FIG. 4B is a flow diagram illustrating a method of providing a cached firmware update to a user equipment according to an embodiment of the present disclosure.

FIG. 4B is a flow diagram illustrating a method of providing a cached firmware update to a user equipment according to an embodiment of the present disclosure.

Referring to FIG. 4B, it can be noted that the method operations 402-412 explained in FIGS. 4A and 4B are the same. Operation 414 is not included in FIG. 4B. If the user equipment 104A has reselected another base station 102' during redirection of the request, then at operation 452, the base station 102 forwards the re-directed request for firmware update to the other base station 102' currently serving the user equipment 104A. At operation 454, the other base station 102' transmits the cached firmware update 122 to the user equipment 104A over the wireless air interface if the cached firmware update 122 is available in the cache memory 116. Alternatively, if the cached firmware update 122 is not available in the cache memory 116, the other base station 102' performs the operations 202 to 214.

Figure 4C:
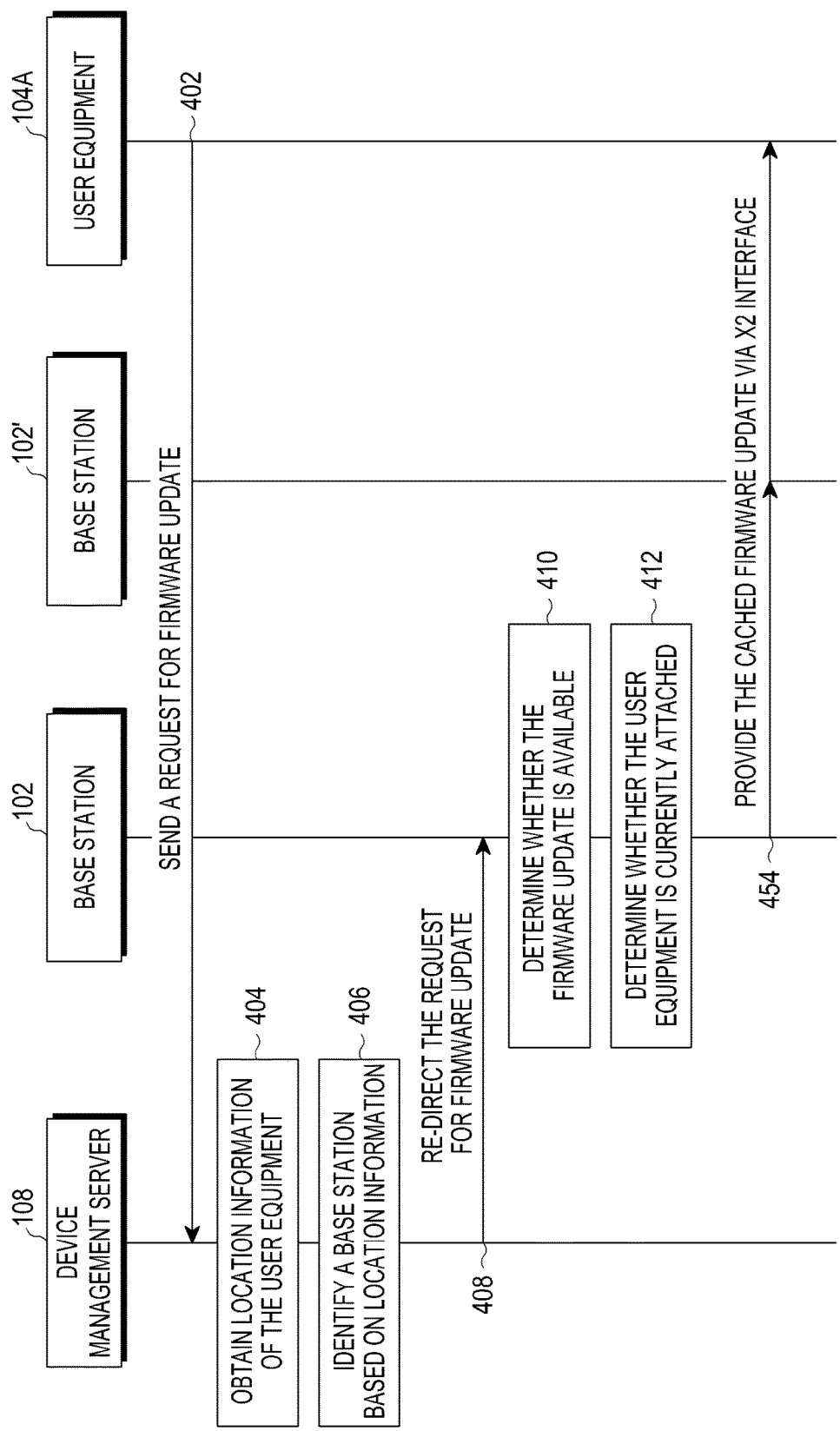
FIG. 4C is a flow diagram illustrating a method of providing a cached firmware update to a user equipment according to an embodiment of the present disclosure.

FIG. 4C is a flow diagram illustrating a method of providing a cached firmware update to a user equipment according to an embodiment of the present disclosure.

Figure 5:
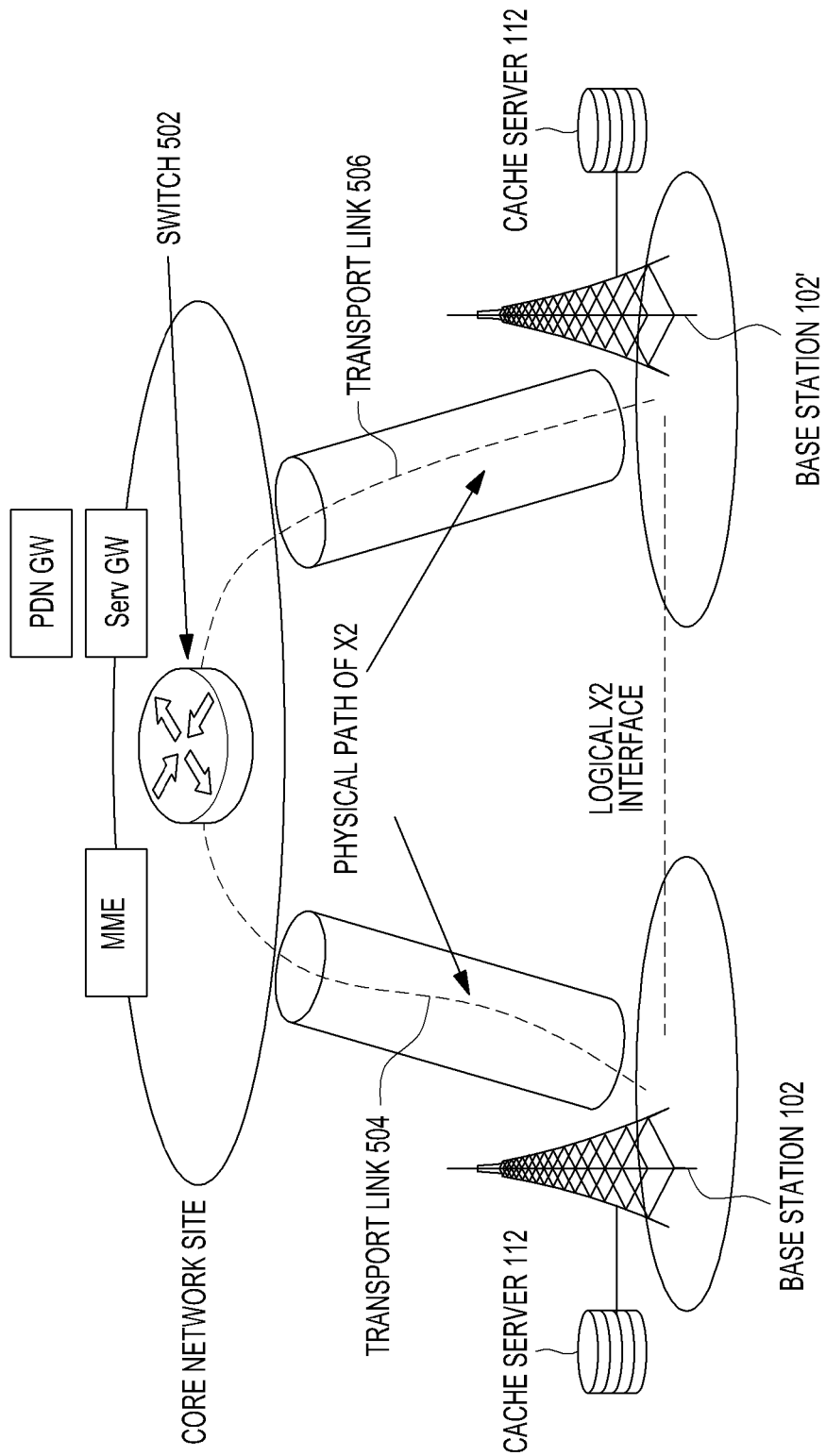
FIG. 5 is a schematic representation illustrating a scenario in which a base station provides a cached firmware update to a user equipment attached to another base station via an X2 interface according to an embodiment of the present disclosure.

Referring to FIG. 4C, it can be noted that the method operations 402-412 explained in FIGS. 4A and 4C are same. Operation 414 is not included in FIG. 4C. If the user equipment 104A has reselected another base station 102' during the firmware update procedure, then at operation 454, the base station 102 continues to transmit the cached firmware update 122 to the user equipment 104A currently associated with the other base station 102' over an X2 interface as depicted in FIG. 5. Alternatively, if the base station 102' has the cached firmware update being transmitted to the user equipment 104A, the base station 102' may take over the transmission of the remaining segments of the cached firmware update and indicate the same to the base station 102.

FIG. 5 is a schematic representation illustrating a scenario in which a base station provides a cached firmware update to a user equipment attached to another base station via an X2 interface according to an embodiment of the present disclosure.

Referring to FIG. 5, it is assumed that the user equipment 104A moves from a first cell location to a second cell location during the firmware upgrade to the device management server 108. That is, the user equipment 104A reselects a base station 102' associated with the second cell location during the firmware update. In such case, the base station 102 continues to provide the cached firmware update 122 to the user equipment 104A via an X2 interface between the base station 102 and the base station 102'.

In various embodiments, the base station 102 continues to transmit the cached firmware update 122 to the user equipment 104A via a switch 502 connecting the base station 102 and the base station 102'. For example, the base station 102 and the base station 102' are connected to the switch 502 via a transport link 504 and a transport link 506. The physical path between the base station 102 and the switch 502 and between the switch 502 and the base station 102' is commonly known as X2 interface. According to the present disclosure, the base station 102 communicates the firmware update to the switch 502 via the transport link 504 and the switch 502 communicates the firmware update to the base station 102' via the transport link 506.

Figure 6:
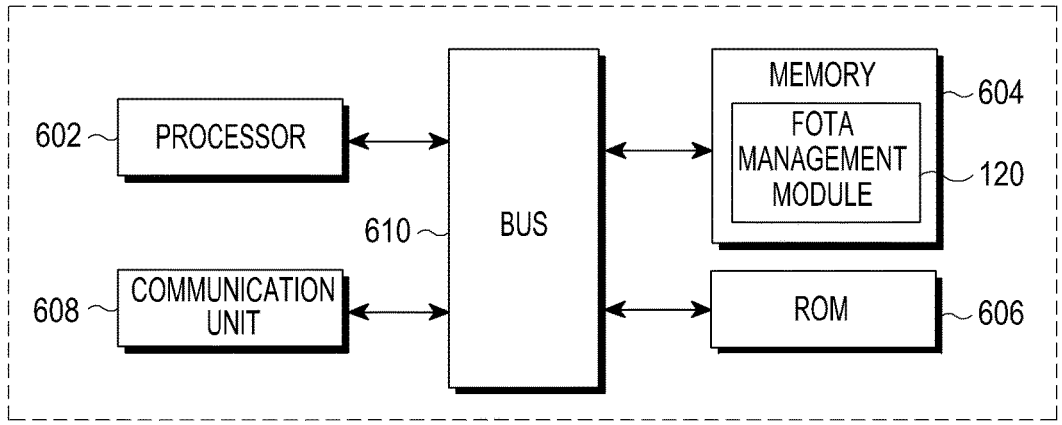
FIG. 6 illustrates a block diagram of a device management server, such as the device management server shown in FIG. 1 according to an embodiment of the present disclosure.

FIG. 6 illustrates a block diagram of a device management server, such as the device management server shown in FIG. 1 according to an embodiment of the present disclosure.

Referring to FIG. 6, the device management server 108 includes a processor 602, memory 604, a Read Only Memory (ROM) 606, a communication unit 608, and a bus 610.

The processor 602, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 602 may also include embedded controllers, such as generic or programmable logic devices or arrays, application specific integrated circuits, single-chip computers, smart cards, and the like.

The memory 604 may be volatile memory and/or non-volatile memory. The memory 604 may include a FOTA management module 120 for managing firmware over the air service in a wireless network environment, according to the various embodiments illustrated in FIGS. 1 to 5. A variety of computer-readable storage media may be stored in and accessed from the memory elements. Memory elements may include any suitable memory device(s) for storing data and machine-readable instructions such as read only memory, random access memory, erasable programmable read only memory, electrically erasable programmable read only memory, hard drive, removable media drive for handling memory cards, Memory Sticks™, and the like.

Various embodiments of the present subject matter may be implemented in conjunction with modules including functions, procedures, data structures, and application programs, for performing tasks, defining abstract data types, or low-level hardware contexts. The FOTA management module 120 may be stored in the form of machine-readable instructions on any of the above-mentioned storage media and is executable by the processor 602. For example, a computer program may include the machine-readable instructions capable of managing a firmware over the air service in the wireless network environment, according to the teachings and herein described various embodiments of the present subject matter. The computer program may be included on a non-transitory computer-readable storage medium and loaded from the storage medium to a hard drive in the non-volatile memory.

The components such as the ROM 606, the communication unit 608, and the bus 610 are well known to the person skilled in the art and hence the explanation is thereof omitted.

Figure 7:
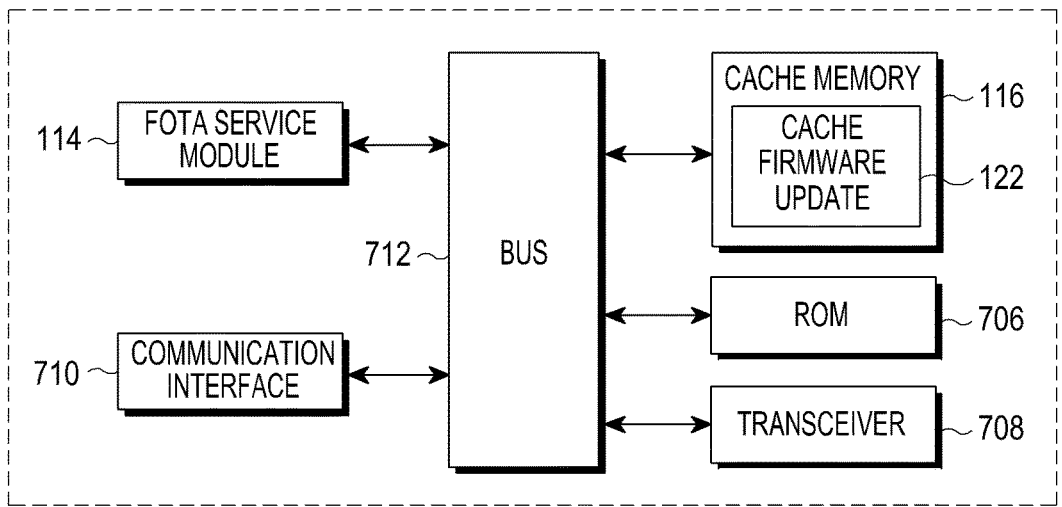
FIG. 7 illustrates a block diagram of a cache server, such as the cache server shown in FIG. 1 according to an embodiment of the present disclosure.

FIG. 7 illustrates a block diagram of a cache server, such as the cache server shown in FIG. 1 according to an embodiment of the present disclosure.

Referring to FIG. 7, the cache server 112 includes the FOTA service module 114, the cache memory 116, a ROM 706, a transceiver 708, a communication interface 710, and a bus 712.

The FOTA service module 114 is configured for obtaining and caching firmware update intended for the user equipments 104A-N, and providing the cached firmware update 122 to the user equipments 104A-N, according to the various embodiments illustrated in FIGS. 1 to 5. In one embodiment, the FOTA service module 114 means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The FOTA service module 114 may also include embedded controllers, such as generic or programmable logic devices or arrays, application specific integrated circuits, single-chip computers, smart cards, and the like.

The cache memory 116 may be volatile memory and/or non-volatile memory. The cache memory 116 is configured for caching the firmware update obtained from the FOTA server 110. Memory elements may include any suitable memory device(s) for storing data and machine-readable instructions such as read only memory, random access memory, erasable programmable read only memory, electrically erasable programmable read only memory, hard drive, removable media drive for handling memory cards, Memory Sticks™, and the like.

Various embodiments of the present subject matter may be implemented in conjunction with modules including functions, procedures, data structures, and application programs, for performing tasks, defining abstract data types, or low-level hardware contexts. In an alternate embodiment, the FOTA service module 114 may be stored in the form of machine-readable instructions on any of the above-mentioned storage media and is executable by a processor. For example, a computer program may include the machine-readable instructions capable of obtaining and caching firmware update intended for user equipments 104A-N and providing the cached firmware update 122 to the user equipment 104A-N, according to the teachings and herein described various embodiments of the present subject matter. The computer program may be included on a non-transitory computer-readable storage medium and loaded from the storage medium to a hard drive in the non-volatile memory.

The components such as the ROM 706, the transceiver 708, the communication interface 710, and the bus 712 are well known to the person skilled in the art and hence the explanation is thereof omitted.

While the present disclosure has been described with reference to various embodiments thereof, it will be understood by those skilled in the art that various changes in form and details may be made to these embodiments without departing from the spirit and scope of the present disclosure as defined by the appended claims and their equivalents. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method of providing a firmware over-the-air (FOTA) service to a user equipment (UE) in a wireless network environment, the method comprising:
   receiving, by a base station, a request for firmware update from a device management server after the request for firmware update is transmitted by a first UE to the device management server;
   determining, by the base station, whether the firmware update is available in a cache memory in the base station in response to the request for the firmware update;
   if the firmware update is not available in the cache memory in the base station, caching the firmware update into the cache memory;
   if the firmware update is available in the cache memory in the base station, determining whether the first UE is attached to the base station;
   redirecting the request for firmware update to another base station in which the first UE is being currently attached if the first UE does not attach to the base station, wherein the firmware update forwarded to the another base station is provided to the first UE by the another base station after redirecting the request for firmware update;
   sending a local paging message indicating availability of the firmware update to a second UE; and
   providing the firmware update to the second UE if a response of the local paging message is received.

2. The method of claim 1,
   wherein the providing of the firmware update to the another base station comprises forwarding the request for firmware update received from the first UE to the another base station in response to the first UE not being currently attached to the base station.

3. The method of claim 1, wherein the providing of the firmware update to the another base station comprises providing the firmware update to the another base station over an X2 interface between the base station and the another base station.

4. The method of claim 1, further comprising obtaining identity information associated with the first UE based on a core network identity.

5. The method of claim 1, further comprising:
   determining whether a paging response corresponding to the local paging message is received; and
   resending, if the paging response corresponding to the local paging message is not received, the local paging message to the second UE,
   wherein the local paging message includes a paging clause or a paging indication flag set as an FOTA update indicator.

6. The method of claim 1, further comprising:
   obtaining a firmware update resource identifier associated with the firmware update from the device management server when a notification indicating availability of the firmware update is received from the device management server; and
   obtaining the firmware update from the FOTA server using the firmware update resource identifier.

7. A base station, comprising:
   a processor configured to:
      receive a request for firmware update from a device management server after the request for firmware update is transmitted by a first UE to the device management server,
      determine whether the firmware update is available in a cache memory in the base station in response to the request for the firmware update,
      if the firmware update is not available in the cache memory in the base station, cache the firmware update into the cache memory,
      if the firmware update is available in the cache memory in the base station, determine whether the first UE is attached to the base station,
      redirect the request for firmware update to another base station in which the first UE is being currently attached if the first UE does not attach to the base station, wherein the firmware update forwarded to the another base station is provided to the first UE by the another base station after redirecting the request for firmware update,
      send a local paging message indicating availability of the firmware update to a second UE, and
      provide the firmware update to the second UE if a response of the local paging message is received.

8. The base station of claim 7,
   wherein the processor is further configured to forward the request for firmware update received from the first UE to the another base station in response to the first UE not being currently attached to the base station.

9. The base station of claim 7, wherein the processor is further configured to provide the firmware update to the another base station over an X2 interface between the base station and the another base station.

10. The base station of claim 7, wherein the processor is further configured to obtain identity information associated with the first UE based on a core network identity.

11. The base station of claim 7,
wherein the processor is further configured to:
   determine whether a paging response corresponding to the local paging message is received, and
   resend, if the paging response corresponding to the local paging message is not received, the local paging message to the second UE, and
wherein the local paging message includes a paging clause or a paging indication flag set as an FOTA update indicator.

12. The base station of claim 7, wherein the processor is further configured to:
   obtain a firmware update resource identifier associated with the firmware update from the device management server when a notification indicating availability of the firmware update is received from the device management server; and
   obtain the firmware update from the FOTA server using the firmware update resource identifier.

\* \* \* \* \*